(12) United States Patent
Wong et al.

(10) Patent No.: US 9,409,705 B2
(45) Date of Patent: *Aug. 9, 2016

(54) SYSTEM, A METHOD AND A CAPSULE FOR PREPARING A PRE-DETERMINED QUANTITY OF BEVERAGE

(71) Applicant: Koninklijke Douwe Egberts B.V., Utrecht (NL)

(72) Inventors: Kon Euan Gerard Wong, Burwood East (AU); Guido Brandt, Utrecht (NL); Hendrik Cornelis Koeling, Utrecht (NL); Ralf Kamerbeek, De Meern (NL); Arend Cornelis Jacobus Biesheuvel, Werkendam (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/470,677

(22) Filed: Aug. 27, 2014

(65) Prior Publication Data

US 2015/0050394 A1    Feb. 19, 2015

Related U.S. Application Data

(63) Continuation of application No. 13/316,427, filed on Dec. 9, 2011, now Pat. No. 8,846,120, which is a continuation of application No. PCT/NL2009/050817, filed on Dec. 30, 2009.

(30) Foreign Application Priority Data

Jun. 17, 2009    (EP) .................................... 09162934
Jun. 17, 2009    (EP) .................................... 09162982
Jun. 17, 2009    (EP) .................................... 09162995
Jun. 17, 2009    (EP) .................................... 09162998

(51) Int. Cl.
*B65D 85/804*    (2006.01)
*A47J 31/36*    (2006.01)
(Continued)

(52) U.S. Cl.
CPC ......... *B65D 85/8043* (2013.01); *A47J 31/3695* (2013.01); *B65D 77/32* (2013.01); *B65D 77/38* (2013.01)

(58) Field of Classification Search
CPC .................................................... B65D 85/8043
See application file for complete search history.

(56) References Cited

U.S. PATENT DOCUMENTS 3,615,708 A    10/1971  Abile-Gal
4,136,202 A    1/1979   Favre
(Continued)

FOREIGN PATENT DOCUMENTS

CN    1125681    6/1996
CN    1612831    5/2005
(Continued)

OTHER PUBLICATIONS

International Search Report for PCT Patent Application No. PCT/NL2009/050816, dated Mar. 1, 2010, 2 pages.
(Continued)

*Primary Examiner* — Erik Kashnikow
*Assistant Examiner* — C Smith
(74) *Attorney, Agent, or Firm* — Foley & Lardner LLP (57) ABSTRACT

A system and method for preparing a predetermined quantity of beverage suitable for consumption using an extractable product includes at least one disposable capsule; an apparatus comprising a fluid dispensing device for supplying an amount of fluid to the at least one capsule, a receptacle for accommodating the at least one capsule, and an outlet arrangement for supplying the beverage to a container, such as a cup. The at least one disposable capsule comprises a material barrier for enclosing an inner space comprising the extractable product. The disposable capsule further comprises a displaceable body conceived to interact with the material barrier for discontinuing at least an exit area thereof for enabling passage of the at least a portion of the beverage away from the capsule.

20 Claims, 6 Drawing Sheets

(51) Int. Cl.
   *B65D 77/32*  (2006.01)
   *B65D 77/38*  (2006.01)

(56) References Cited

U.S. PATENT DOCUMENTS

| | | |
|---|---|---|
| 4,321,139 A | 3/1982 | Auclair |
| 4,417,504 A | 11/1983 | Yamamoto |
| 4,846,052 A | 7/1989 | Favre et al. |
| 4,859,337 A | 8/1989 | Woltermann |
| 5,325,765 A | 7/1994 | Sylvan et al. |
| 5,327,815 A | 7/1994 | Fond et al. |
| 5,398,595 A | 3/1995 | Fond et al. |
| 5,402,707 A | 4/1995 | Fond et al. |
| 5,649,472 A | 7/1997 | Fond et al. |
| 5,762,987 A | 6/1998 | Fond et al. |
| 5,826,492 A | 10/1998 | Fond et al. |
| 5,840,189 A | 11/1998 | Sylvan et al. |
| D408,679 S | 4/1999 | Potts et al. |
| 5,897,899 A | 4/1999 | Fond |
| 6,079,315 A | 6/2000 | Beaulieu et al. |
| 6,082,247 A | 7/2000 | Beaulicu |
| 6,142,063 A | 11/2000 | Beaulieu et al. |
| 6,182,554 B1 | 2/2001 | Beaulieu et al. |
| D452,433 S | 12/2001 | Lazaris |
| D452,434 S | 12/2001 | Sweeney |
| 6,440,256 B1 | 8/2002 | Gordon et al. |
| D462,865 S | 9/2002 | Honan et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,644,173 B2 | 11/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| D489,215 S | 5/2004 | Honan et al. |
| D502,362 S | 3/2005 | Lazaris et al. |
| D513,572 S | 1/2006 | Schaffeld et al. |
| 7,165,488 B2 | 1/2007 | Bragg et al. |
| D544,299 S | 6/2007 | Schaffeld et al. |
| D554,299 S | 10/2007 | Ragonetti et al. |
| 7,279,188 B2 | 10/2007 | Arrick et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| 7,490,542 B2 | 2/2009 | Macchi et al. |
| 7,513,192 B2 | 4/2009 | Sullivan et al. |
| 7,523,695 B2 | 4/2009 | Streeter et al. |
| 7,543,527 B2 | 6/2009 | Schmed |
| 7,552,672 B2 | 6/2009 | Schmed |
| 7,604,826 B2 | 10/2009 | Denisart et al. |
| 7,624,673 B2 | 12/2009 | Zanetti |
| 7,640,845 B2 | 1/2010 | Woodnorth et al. |
| 7,703,381 B2 | 4/2010 | Liverani et al. |
| 7,815,953 B2 | 10/2010 | Mastropasqua et al. |
| 7,836,819 B2 | 11/2010 | Suggi Liverani et al. |
| 7,854,192 B2 | 12/2010 | Denisart et al. |
| 7,856,920 B2 | 12/2010 | Schmed et al. |
| 7,856,921 B2 | 12/2010 | Arrick et al. |
| 7,930,972 B2 | 4/2011 | Denisart et al. |
| 7,946,217 B2 | 5/2011 | Favre et al. |
| 7,993,691 B2 | 8/2011 | Yoakim et al. |
| 8,147,887 B2 | 4/2012 | Dogan et al. |
| 8,161,866 B2 | 4/2012 | Kollep et al. |
| 8,161,868 B2 | 4/2012 | Bolzicco et al. |
| 8,202,560 B2 | 6/2012 | Yoakim et al. |
| 8,220,382 B2 | 7/2012 | Verbeek |
| 8,304,006 B2 | 11/2012 | Yoakim et al. |
| 2003/0172813 A1 | 9/2003 | Schifferle |
| 2004/0045443 A1 | 3/2004 | Lazaris et al. |
| 2004/0188459 A1 | 9/2004 | Halliday et al. |
| 2005/0051478 A1 | 3/2005 | Karanikos et al. |
| 2005/0205601 A1 | 9/2005 | Taylor |
| 2005/0287251 A1 | 12/2005 | Lazaris et al. |
| 2006/0019000 A1 | 1/2006 | Zanetti |
| 2006/0110507 A1 | 5/2006 | Yoakim et al. |
| 2006/0174773 A1 | 8/2006 | Taylor |
| 2006/0292012 A1 | 12/2006 | Brudevold et al. |
| 2007/0068395 A1 | 3/2007 | Masek et al. |
| 2007/0084352 A1 | 4/2007 | Yuen et al. |
| 2007/0186784 A1 | 8/2007 | Liverani et al. |
| 2007/0224319 A1 | 9/2007 | Yoakim et al. |
| 2008/0095904 A1 | 4/2008 | Sullivan et al. |
| 2008/0105131 A1 | 5/2008 | Castellani |
| 2008/0115674 A1 | 5/2008 | Huang et al. |
| 2008/0134902 A1 | 6/2008 | Zimmerman et al. |
| 2008/0216666 A1 | 9/2008 | Doglioni Majer |
| 2008/0245236 A1 | 10/2008 | Ternite et al. |
| 2008/0317931 A1 | 12/2008 | Mandralis et al. |
| 2009/0007794 A1 | 1/2009 | Cortese |
| 2009/0007796 A1 | 1/2009 | Ricotti |
| 2009/0017177 A1 | 1/2009 | Yoakim et al. |
| 2009/0126577 A1 | 5/2009 | Ternite |
| 2009/0158938 A1 | 6/2009 | Jarisch et al. |
| 2009/0205503 A1 | 8/2009 | Cortese |
| 2009/0255410 A1 | 10/2009 | Jarisch et al. |
| 2009/0280219 A1 | 11/2009 | Yoakim et al. |
| 2010/0024658 A1 | 2/2010 | Jacobs et al. |
| 2010/0037779 A1 | 2/2010 | Pecci et al. |
| 2010/0043644 A1 | 2/2010 | Suggi Liverani et al. |
| 2010/0043645 A1 | 2/2010 | Suggi Liverani et al. |
| 2010/0043646 A1 | 2/2010 | Suggi Liverani et al. |
| 2010/0064899 A1 | 3/2010 | Aardenburg |
| 2010/0077928 A1 | 4/2010 | Schmed et al. |
| 2010/0101428 A1 | 4/2010 | Fin |
| 2010/0129512 A1 | 5/2010 | Accursi |
| 2010/0154647 A1 | 6/2010 | Skalski et al. |
| 2010/0154651 A1 | 6/2010 | Skalski et al. |
| 2010/0186599 A1 | 7/2010 | Yoakim et al. |
| 2010/0203208 A1 | 8/2010 | Yoakim et al. |
| 2010/0288131 A1 | 11/2010 | Kilber et al. |
| 2010/0303964 A1 | 12/2010 | Beaulieu et al. |
| 2011/0030563 A9 | 2/2011 | Doglioni Majer |

FOREIGN PATENT DOCUMENTS

| | | |
|---|---|---|
| CN | 101309840 | 11/2008 |
| CN | 101410041 | 4/2009 |
| CN | 101421172 | 4/2009 |
| EP | 1 775 234 | 4/2007 |
| GB | 1 256 247 A | 12/1971 |
| JP | 62-160005 | 7/1987 |
| JP | 62-188626 | 8/1987 |
| JP | 01-310612 | 12/1989 |
| JP | 02-231043 | 9/1990 |
| JP | 63-047890 | 12/1994 |
| JP | 2001-061663 | 10/2000 |
| JP | 2000-336570 | 12/2000 |
| JP | 2002-284238 | 10/2002 |
| JP | 2004-534697 | 11/2004 |
| JP | 2005-211659 | 8/2005 |
| WO | WO-02/081337 A1 | 10/2002 |
| WO | WO-03/059778 A2 | 7/2003 |
| WO | WO-2004/064582 | 8/2004 |
| WO | WO-2006/030461 | 3/2006 |
| WO | WO-2006/045537 | 5/2006 |
| WO | WO-2007/114685 A1 | 10/2007 |
| WO | WO-2008/078990 | 7/2008 |
| WO | WO-2008/117329 A1 | 10/2008 |
| WO | WO-2008/125256 A1 | 10/2008 |
| WO | WO-2008/132571 A1 | 11/2008 |
| WO | WO-2009/006379 | 1/2009 |

OTHER PUBLICATIONS

Office Action for Chinese Application No. 200980160935.3, mail date Nov. 19, 2013, 12 pages.

(56) References Cited

OTHER PUBLICATIONS

Office Action for Chinese Application No. 200980160984.7, mail date Nov. 5, 2013, 22 pages.
Search Report for Application No. 200980160985.1, mail date Aug. 30, 2013, 2 pages.
Search Report for Chinese Application No. 200980160935.3, mail date Nov. 8, 2013, 2 pages.
Search Report for Chinese Application No. 200980160984.7, mail date Oct. 28, 2013, 2 pages.

PRIOR ART

Fig. 1A

PRIOR ART

SYSTEM, A METHOD AND A CAPSULE FOR PREPARING A PRE-DETERMINED QUANTITY OF BEVERAGE

CROSS-REFERENCE TO RELATED PATENT APPLICATIONS

This application is a continuation of U.S. application Ser. No. 13/316,427, filed Dec. 9, 2011, which is a continuation of International Application No. PCT/NL2009/050817, filed on Dec. 30, 2009, which claims priority to European Application Nos. 09162998.0, 09162934.5, 09162995.6, and 09162982.4, all filed on Jun. 17, 2009. All of these applications are hereby incorporated herein by reference in their entireties.

FIELD OF THE INVENTION

The invention relates to a system for preparing a predetermined quantity of beverage suitable for consumption using an extractable product, comprising: at least one disposable capsule; an apparatus comprising a fluid dispensing device for supplying an amount of fluid, such as water, to the at least one disposable capsule, a receptacle for accommodating the at least one disposable capsule, and an outlet arrangement for supplying the beverage to a container, such as a cup, wherein the at least one disposable capsule comprises a material barrier for enclosing an inner space comprising the extractable product, wherein the material barrier comprises: an entrance area enabling passage of the fluid towards the inner space for interacting with the extractable product for preparing the beverage; an exit area for conducting at least a portion of the beverage away from the capsule; wherein the system is further arranged for: bringing the dispensing device in fluid communication with the entrance area for supplying the fluid; enabling the exit area to be positioned in a fluid communication with the outlet arrangement.

The invention further relates to a capsule of a system as is set forth in the foregoing. In particular, according to an aspect of the invention a capsule relates to a substantially hermetically closed capsule which comprises a material barrier for enclosing an inner space comprising the extractable product, wherein the material barrier comprises: an entrance area enabling passage of the fluid towards the inner space for interacting with the extractable product for preparing the beverage; an exit area for conducting at least a portion of the beverage away from the capsule.

The invention still further relates to a method of preparing a predetermined quantity of beverage suitable for consumption using extractable product in a system, comprising: at least one disposable capsule; an apparatus comprising a fluid dispensing device for supplying an amount of fluid, such as water, to the at least one disposable capsule, a receptacle for accommodating the at least one disposable capsule, and an outlet arrangement for supplying the beverage to a container, such as a cup, wherein the at least one disposable capsule is provided with an outer material barrier for enclosing an inner space comprising the extractable product, wherein the material barrier is provided with: an entrance area enabling passage of the fluid towards the inner space for interacting with the extractable product for preparing the beverage; an exit area for conducting at least a portion of the beverage away from the capsule; wherein the system is further arranged for: bringing the dispensing device in fluid communication with the entrance area for supplying the fluid; enabling the exit area to be positioned in a fluid communication with the outlet arrangement.

The invention still further relates to a method of manufacturing a disposable capsule for preparing a predetermined quantity of beverage suitable for consumption using extractable product, the method comprising: forming the disposable capsule with an outer material barrier for enclosing an inner space comprising the extractable product, wherein the material barrier is provided with: an entrance area enabling passage of a fluid towards the inner space for interacting with the extractable product for preparing the beverage; an exit area for conducting at least a portion of the beverage away from the capsule; filling the inner space of the disposable capsule with the extractable product.

BACKGROUND

In the art hermetically sealed capsules comprising, for example, ground coffee, for placement in a coffee dispensing apparatus, are known per se. During coffee preparation the entrance area of such sealed capsule is pierced, so that entrance openings are provided for supplying fluid under pressure to the ground coffee in the inner space of the capsule. This in turn causes the pressure in the inner space of the capsule to rise, such that an exit area of the capsule is pressed against lid piercing means that are present in the apparatus. When sufficient pressure is applied, the exit area will tear against the lid piercing means creating exit openings through which the coffee drink can drain from the capsule through an outlet present in the apparatus. In use, the outlet is in fluid communication with the exit area of the receptacle so that coffee drink may flow through the outlet.

It has been found that in a system as explained above, preferential paths of fluid may flow through the extractable product within the capsule, e.g. from the at least one entrance opening to the at least one exit opening, which may lead to undesired strength of the prepared beverage and/or variations in strength of the prepared beverage, from one capsule to another. Moreover, since the exit openings are formed by fluid pressure, the number, position and/or size of the exit openings are formed by chance.

SUMMARY

It is therefore one of the objects of the invention to provide for a alternative system, capsule and method.

To this end in the system according to the invention the disposable capsule further comprises a displaceable body conceived to interact with the material barrier for discontinuing at least the exit area thereof for enabling passage of the at least a portion of the beverage away from the capsule.

This technical measure is based on the insight that by providing a displaceable body in the capsule creation of predetermined one or more exit openings is possible in terms of timing, spatial distribution along a surface of the capsule and dimension thereof. It will be appreciated that the displaceable body is preferably arranged inside the inner space of the capsule, that is in an internal volume accommodating the extractable product.

It will be appreciated that the term 'material barrier' should be understood as a material instance preventing penetration of undesired molecules present or possibly present in the ambient environment into the inner space of the capsule. Preferably, the material barrier is formed for preventing gases, damps and vapours from penetrating into the inner space. This measure may be further referred to as sealing. As a result, suitable selected qualities of the extractable product enclosed in the capsule do not deteriorate and/or are conserved by preventing undergoing undesirable chemical reactions with environmental chemical species. In particular, oxidizing of coffee may be prevented thereby substantially preserving it's original taste, which may result in an improved quality of the beverage.

It will further be appreciated that the extractable product is not limited to coffee, as any type of solid, liquid, or powdered matter may be used for preparing the beverage. For example, the capsule may comprise a concentrate, in either liquid, solid or powdered form. Alternatively, or additionally, the capsule may comprise powdered, milk, chocolate powder, soup powder, etc. It is also possible that the capsule comprises a suitable number of compartments accommodating a suitable number of constituents of the conceived beverage, which are intermixed upon interaction with the fluid.

It will further be appreciated that the terms 'exit area' and 'entrance area' denote respective functional regions, for example on the surface of the capsule, which may be not perceivable by a bare eye. This may be possible when the capsules are shaped in such a way that a unique accommodation in the receptacle is enabled. Alternatively, the 'exit area' and/or the 'entrance area' may be suitably marked on the capsule for enabling a suitable positioning thereof in the system. This has a particular advantage when the capsule is shaped allowing for diverse positioning in the accommodating receptacle, for example, when the capsule has a rotational degree of freedom, for example is spherical, cylindrical or the like. It will be appreciated that the disposable capsule may be marketed in a package comprising a number of disposable capsules, wherein optimization of stacking in the package may lead to a desirable three-dimensional shape of the capsule which allows for orientational uncertainty in the receptacle. Particularly for such capsules identification of the 'exit area' and the 'entrance area' may be advantageous.

It will further be appreciated that the outlet arrangement may comprise a suitable collector and a conduit for guiding the beverage into the container. However, it is also possible that the outlet arrangement is integrated with the receptacle and does not have any specific collector or conduit.

It will further be appreciated that the term 'extractable product' encompassed substances which are soluble, or are used to form suitable colloids, like instant coffee and soup-puree, for example.

In an embodiment of the system according to the invention the capsule is substantially cylindrically formed, the material barrier comprising a circumferential wall, a bottom, and a lid.

It may be advantageous to maximize a surface area of the exit area, by shaping the disposable capsule like, for example, a pellet, or, alternatively, like a truncated cone or a pyramid. In these exemplary embodiments, the surface area of a base portion of a resulting three-dimensional object is increased improving draining of the capsule. When the disposable capsule is shaped as a pellet, a path of the fluid between the entrance area and the exit area may be minimized, which may decrease a chance of occurring of preferential paths of the fluid in the capsule. When the disposable capsule is shaped as a truncated cone or a pyramid, the fluid, entering the capsule substantially from a vertex of the cone or the pyramid may have a showering effect, substantially decreasing a chance of occurring of preferential paths of the fluid in the capsule.

Additionally, a combination of the above shaping possibilities of the capsule together with intrinsic opening functionality using the displaceable body may decrease a minimum necessary pressure of the fluid sufficient for preparing the beverage. This has an effect of reducing power consumption of the system according to the invention, with respect to the system known from the art.

In a further embodiment of the system according to the invention, the exit area may be provided in the lid of the capsule, wherein the entrance area may be provided in the bottom of the capsule. Such configuration may have an advantage regarding manufacturing ease of the capsule. For example, when the capsule has a bucket-shape, the bottom of the bucket may be used for supplying the fluid, wherein the upper portion of the bucket may be covered by a lid, wherein a lid material may be have a different inherent mechanical strength than the material used for the bucket-shape. Such arrangement may also be advantageous, when the capsule is conceived to be laterally gripped during use.

In a further embodiment of the system according to the invention the displaceable body is chemically inert with respect to the extractable product and/or fluid and/or the beverage.

It is found to be advantageous to select a material for the displaceable body to be substantially chemically inert with respect to the substance of the extractable product. It will be appreciated, that the term 'chemically inert' should be construed as inability to undergo a chemical reaction with the extractable product and/or the fluid and/or the beverage for forming a chemical product. It will be appreciated that the beverage may have different chemical properties than either the extractable product or the fluid. Particularly, the material of the displaceable body is chemically inert also at elevated temperatures, for example, in the range of 90-100° C. This feature may be of a particular importance for public safety.

In a still further embodiment of the system according to the invention, the displaceable body is at least partially soluble in the fluid and/or the beverage. For example, the displaceable body may at least partially be formed from a taste modifier and/or a taste enhancer.

It may be advantageous to utilize the fact that the displaceable body is present in a vicinity of the extractable product. For example, the displaceable body may be prepared from a consumable substance, like sugar or a taste enhancer or a taste modifier. In addition, the displaceable body may be prepared from a solidified liquor concentrate, or the like. As a result, the displaceable body having discontinued the material barrier may dissolve providing a desired additional taste, flavour or other supplementary property to otherwise plane beverage. It may also be possible that the displaceable body is formed from a substance conceived to alter a pH value of the fluid, for example water. This may be particularly advantageous in areas wherein tap water has inferior properties with respect to beverage preparation there with.

In a still further embodiment of the system according to the invention, the material barrier of the disposable capsule comprises displaceable parts.

It is found to be advantageous to provide the displaceable body as a plug-like structure, thereby forming a portion of the material barrier. The displaceable body being protruded inside the inner space of the capsule in use may thereby discontinue the material of the exit area and in course of the same action may provide one or more suitable openings in the entrance area of the capsule. This embodiment will be explained in more detail with reference to FIG. 2.

In a further embodiment of the system according to the invention the material barrier constitutes an outer surface of the disposable capsule.

For example, the material barrier may be provided as a suitable number of peel-off foils covering pre-manufactured openings on the outer surface of the capsule. In use, these peel-off foils are to be removed prior to using the capsule. In this way the material barrier is a composite structure comprising a body of the capsule cooperating with a further body (i.e. peels or the like) for preventing the extractable product from interacting with undesired species from the environment. However, the material barrier may relate to a chamber, a compartment or the like, which is separated from the environment by a further material, layer or body.

In an embodiment, the displaceable body may be arranged to form an actuatable region of the outer material barrier. In this case the material barrier also constitutes a composite structure comprising a portion of the displaceable body at rest, i.e. prior to use. For example, the displaceable body may comprise a working element, i.e. a protrusion or the like for discontinuing the material barrier. The working element of the displaceable body may be shaped as a crown or the like, wherein the crown may be connected to a suitable protrusion, like a stick, which, with its outer end portion, may serve as a plug in a surface of the capsule in or nearby the entrance area. By displacing the body, the crown or the like may provide exit openings for draining and its distal portion (i.e. the plug) may reveal entrance openings for supplying the fluid.

In a further embodiment of the system according to the invention the dispensing device is displaceable in use for engaging the capsule, the displaceable body being positioned in the capsule for enabling a transfer of a mechanical momentum from the dispensing device to the exit area for discontinuing thereof.

It may be advantageous to use mechanical momenta generated in the apparatus during use for enabling a controlled and pre-determined opening of the capsule. In accordance with the present embodiment the dispensing device of the apparatus is conceived to be suitably displaced for engaging the disposable capsule at least in the exit area. Such displacement movement may be used to push or to otherwise actuate the displaceable body causing it to protrude further inside the inner space of the capsule towards the exit area discontinuing a material thereof. This embodiment enables a one-movement capsule handling and capsule piercing, which is controlled and is reproducible thereby improving quality of the beverage, for example because at least it's dwell time inside the capsule is pre-determined.

In a still further embodiment of the system according to the invention, the displaceable body comprises at least one working organ for discontinuing a material of the exit area.

For example, the displaceable body may comprise one or more projections, micro-pins, or other suitable irregularities for discontinuing the material barrier. It will be appreciated that the term 'discontinuing' relates to either of the following—cutting, pinching, tearing, piercing, or the like.

The displaceable body may be arranged as a substantially flat, or a three-dimensional object, for example a pin- or a fork-like structure or a crown-topped stick. It may be possible to envisage a construction of the displaceable body in such a way that the working organ is displaced substantially perpendicular with respect to a surface of the exit area. Alternatively, it may be possible to envisage a construction of the displaceable body in such a way that the working organ is displaced substantially oblique with respect to a surface of the exit area. In the latter case, provided the working organ terminates with a sharpened structure, a relatively faster discontinuation of the material barrier may be enabled.

In a still further embodiment of the system according to the invention, the displaceable body comprises a conduit provided with lateral openings for distributing a portion of the fluid in the internal space of the capsule.

It is found to be advantageous to utilize a fact that the displaceable body comprises a projection for pressing the working element against the exit area. Due to the fact that such projection, for example a stick or the like may be conceived to extend substantially between the entrance area and the exit area via the inner space, it may be advantageous to utilize the projection for supplying at least a portion of the fluid into a deep of the extractable product. In this way the fluid may substantially instantly envelop the extractable product further improving a quality of the beverage.

In a still further embodiment of the system according to the invention, the exit area is conceived to cooperate with an exit filter.

It is found to be advantageous to filter the beverage prior to allowing it to drain from the capsule. For example, it may be desirable to provide a beverage substantially without particles of the extractable product. By placing a suitable filter cooperating with the exit area a desired filtering effect may be achieved. It will be appreciated that a selection of a type and properties of a filter material lies within an ordinary skill of the artisan. Preferably, the filter is be arranged to differentiate between coarse and fine particles of the extractable product, allowing for using multi-sized grain mixtures in the capsule, which may decrease related production costs for disposable capsules comprising such mixtures.

In a still further embodiment of the system according to the invention, the exit filter is arranged in the inner space, the displaceable body being coupled to the exit filter.

It is possible that the exit filter is arranges in a substantial co-planar arrangement with regard to the exit area, wherein a surface of the filter facing the exit area is provided with suitable protrusions for discontinuing a material of the exit area. In this case the filter may be displaced by a member provided in the inner space of the capsule, which, in turn, may be actuated by the fluid disposing device. Also in this embodiment, the member may be provided from at least partially dissolving substance, as is described above. Additionally or alternatively, the member may be provided with an internal conduit and lateral openings for supplying at least a portion of the fluid into the deep of the extractable product. Such configuration has an advantage that the displaceable body is constructional simplified.

In a still further embodiment of the system according to the invention, the exit area of the mechanical barrier comprises a material, which is mechanically weaker than other regions of the mechanical barrier.

It is found to be advantageous to provide the exit area with a weak material so that discontinuing it in use is simplified.

Capsule according to the invention relates to a disposable capsule of a system as is discussed with reference to the foregoing.

Preferably, the capsule according to the invention is manufactured from a biodegradable material, which is advantageous pursuant to environmental issues.

The invention still further relates to use of the capsule, as is set forth in the foregoing, in a system as is described herein before.

These and other aspects of the invention will be discussed in more detail with reference to drawings, wherein like reference numerals refer to like elements. It will be appreciated that the drawings are presents for illustrative purposes and may not be used for limiting the scope of the appended claims.

DESCRIPTION OF EXEMPLARY EMBODIMENTS

Figure 1A:
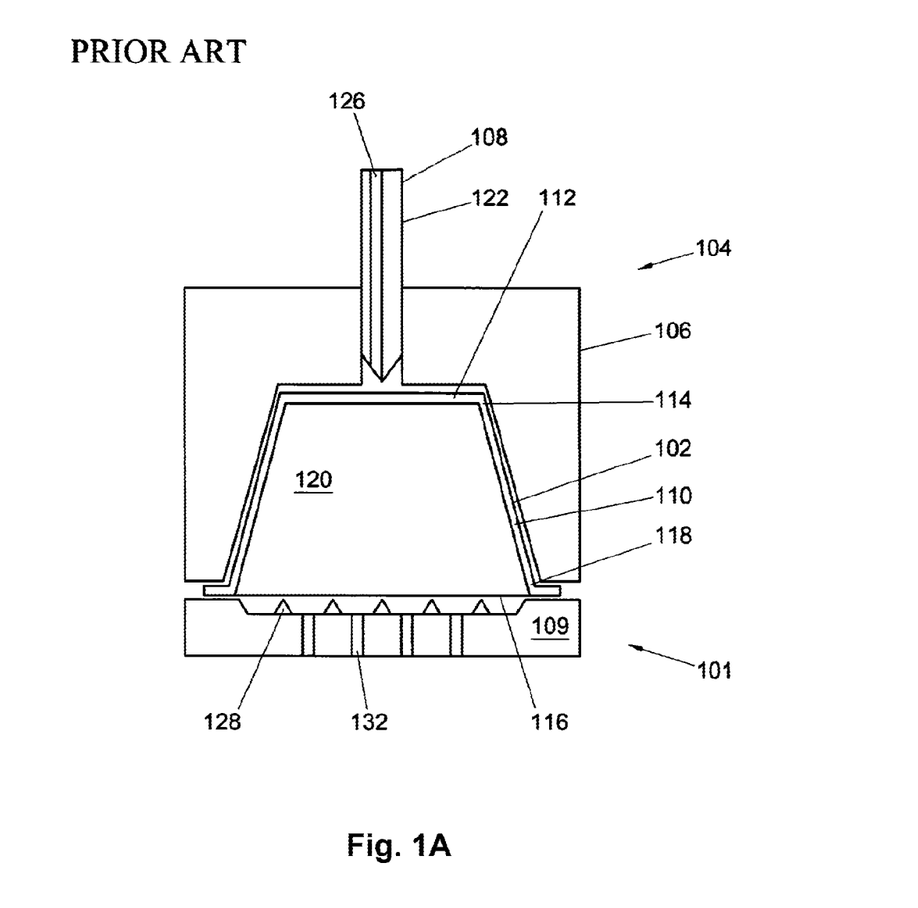
FIG. 1a-c schematically show a prior art system for preparing a beverage in cross-sectional front view.
Figure 1B:
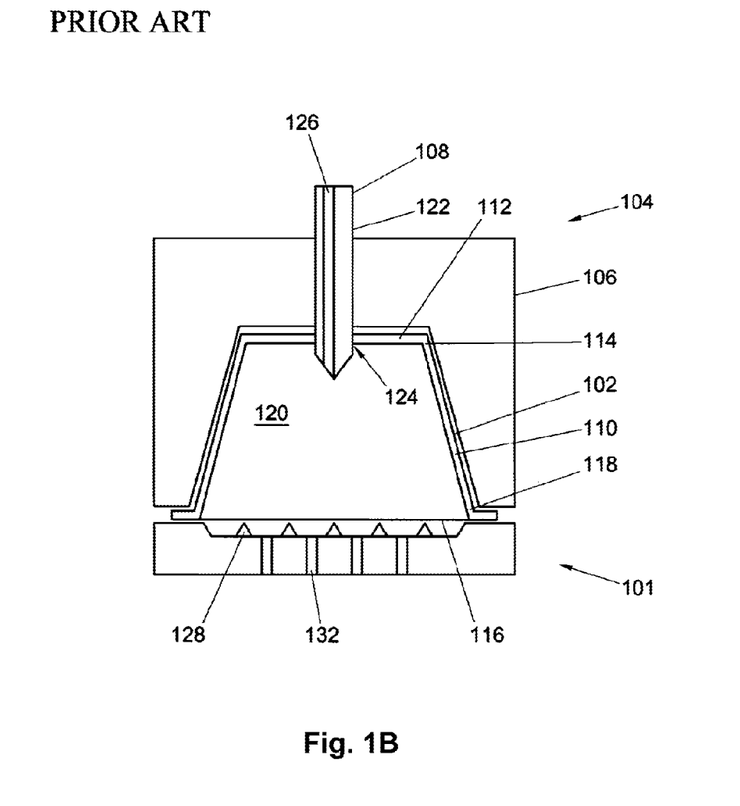
Figure 1C:
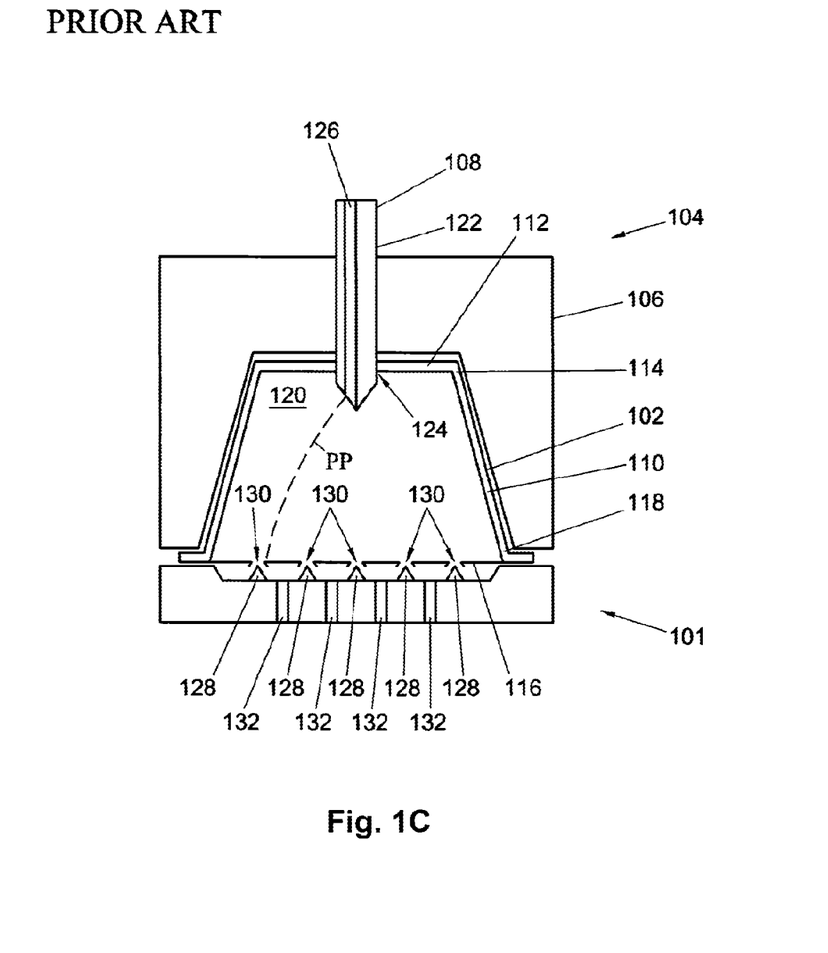

FIGS. 1a-1c show a prior art system 101 for preparing a predetermined quantity of beverage suitable for consumption using an extractable product. The system 101 comprises an exchangeable capsule 102, and an apparatus 104. The apparatus 104 comprises a receptacle 106 for holding the exchangeable capsule 102. In FIGS. 1a-1c a gap is drawn between the capsule 102 and the receptacle 106 for clarity. It will be appreciated that, in use, the capsule 102 may lie in contact with the receptacle 106. Commonly, the receptacle 106 has a shape complementary to the shape of the capsule 102. The apparatus 104 further comprises a fluid dispensing device 108 for supplying an amount of a fluid, such as water, under a pressure, of e.g. 9 bars, to the exchangeable capsule 102. Furthermore, an outlet apparatus 109 may be provided for providing fluid from the capsule 102 to a container such as a cup.

In the system 101 shown in FIGS. 1a-1c, the exchangeable capsule 102 comprises a circumferential wall 110, a bottom 112 closing the circumferential wall 110 at a first end 114, and a lid 116 closing the circumferential wall 110 at a second end 118 opposite the bottom 112. The circumferential wall 110, the bottom 112 and the lid 116 enclose an inner space 120 comprising the extractable product (not shown).

The system 101 of FIGS. 1a-1c comprises bottom piercing means 122 intended for piercing the capsule 102. FIG. 1a shows the bottom piercing means 122 in a retracted position. FIG. 1b shows the bottom piercing means 122 in an extended position for creating an entrance opening 124 in the bottom 112 for supplying the fluid to the extractable product 20 through the entrance opening 124. In FIGS. 1a-1c the piercing means 122 comprise a bore 126 through which the fluid can be supplied to the extractable product 20 contained in the inner space 120. The system 101 of FIGS. 1a-1c further comprises lid piercing means 128, here embodied as protrusions, intended for piercing the lid 116 of the capsule 102. In the shown embodiment, the lid piercing means 128 may form part of the outlet arrangement 109.

The system 101 shown in FIGS. a-1c is operated as follows for preparing a cup of coffee, wherein the extractable product is roasted and ground coffee.

The capsule 102 is placed in the receptacle 106 (see FIG. 1a). The bottom piercing means are activated to pierce the bottom 112 of the capsule 102 (see FIG. 1b) for creating the entrance opening 124. The fluid, here hot water under pressure, is supplied to the extractable product in the inner space 120 through the entrance opening 124. The water will wet the coffee grounds and extract the desired substances to form the coffee beverage.

During supplying the water under pressure to the inner space 120, the pressure inside the capsule 102 will rise. The rise in pressure will cause the lid 116 to deform and be pressed against the lid piercing means 128. Once the pressure reaches a certain level, the tear strength of the lid 116 will be surpassed and the lid will rupture against the lid piercing means 128, creating exit openings 130 (see FIG. 1c). The prepared coffee will drain from the capsule 102 through the exit openings 130 and outlets 132 of the outlet arrangement 109, and may be supplied to a container such as a cup (not shown).

During preparation of the beverage in the system 101 shown in FIGS. 1a-1c preferential flow paths may exist in the extractable product inside the inner space 120 of the capsule 102. These preferential paths may extend from the entrance opening 124 to the exit openings 130. One such possible preferential path is indicated with line PP in FIG. 1c.

Figure 2A:
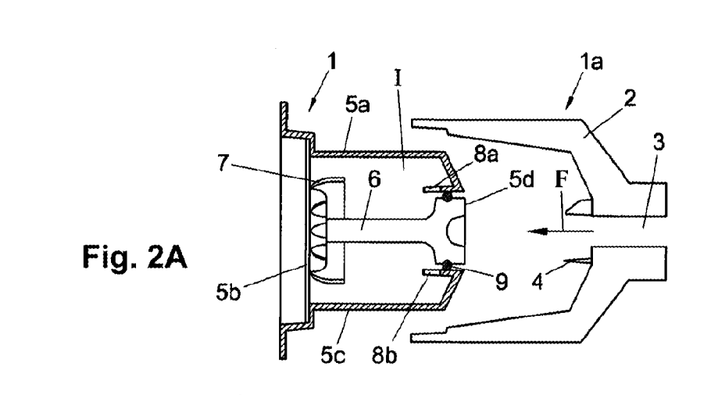
FIG. 2 presents in a schematic way an embodiment of a disposable capsule according to an aspect of the invention.
Figure 2B:
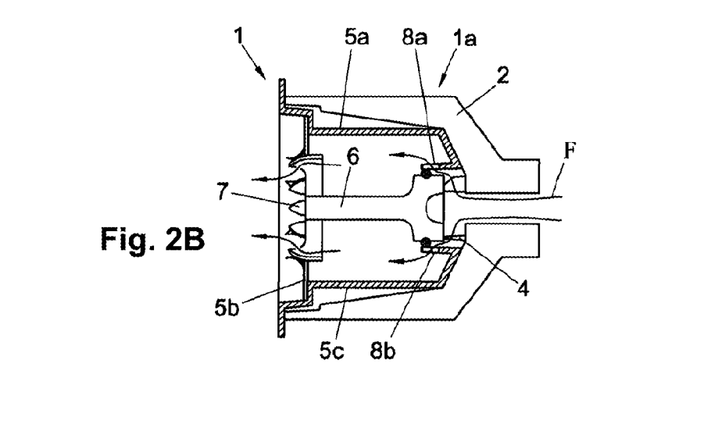
Figure 2C:
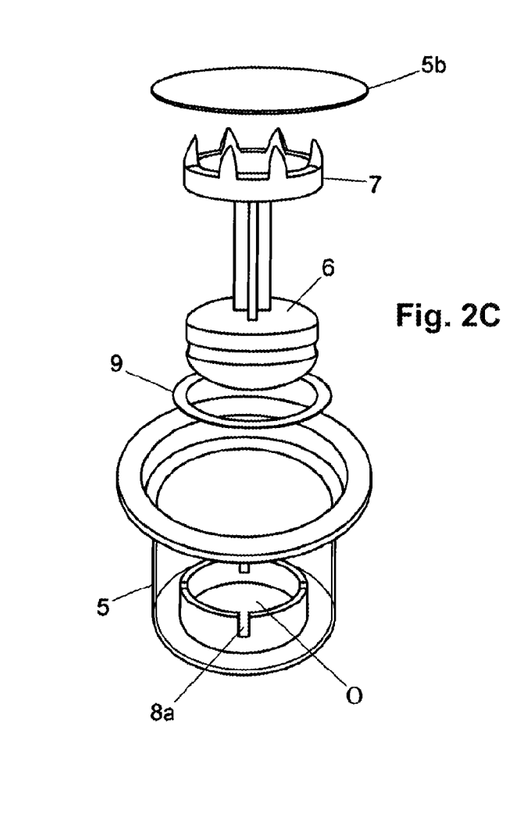

FIG. 2 presents in a schematic way an embodiment of a disposable capsule according to an aspect of the invention. View A presents schematically a cross-section of an embodiment of a disposable capsule 1 together with an embodiment of a portion of a dispensing device before use. The disposable capsule 1 comprises an inner space is conceived to accommodate a suitable amount of an extractable or soluble product, for example, ground coffee, instant coffee, chocolate, cacao, tea, soup mixture, etc. It will be appreciated that the disposable capsule 1 is also suitable to accommodate a powder conceived to form a colloid upon interaction with a fluid F supplied by the dispensing device 1a. The capsule 1 may comprise an amount of extractable soluble or colloidal product, suitable for preparing a single portion of the beverage, preferably a single cup of the beverage, e.g. from 30-200 ml of the prepared beverage. The disposable capsule may relate to a single-portion-pack.

The disposable capsule 1 is constructed for protecting at least the inner space I from interacting with undesired chemical species, for example gases, damps, etc. For this purpose the disposable capsule 1 comprises a material barrier, 5a, 5b, 5c, 5d enclosing at least the inner space. For example, the material barrier may be formed from a single peace of a suitable material, like a foil or a thin layer by welding, gluing, or the like. In this case the material barrier may be substantially homogenous. It is also possible that the material barrier is composed of parts of different materials, particularly, when the capsule is given a specific shape. For example, the capsule 1 may be shaped having a wall, a lid and a bottom, wherein the bottom may be used for allowing the fluid F to enter the inner space and the lid may be used for allowing the beverage to leave at least the inner space. The bottom and the lid may be static with respect to the wall, i.e. in use they do not substantially change their position with respect to the wall. The wall may be substantially rigid. The wall may e.g. comprise a plastics material and may be formed by e.g. injection moulding, vacuum-forming, thermoforming or the like. It is also possible that the material barrier comprises displaceable parts, which in use substantially change relative position to each other for functional purposes, for example for allowing the fluid to enter the inner space I.

View A shows schematically an embodiment of a disposable capsule wherein the material barrier comprises displaceable parts. Portion 5d of the material barrier may be formed by a terminal portion of a bung 6, which is conceived to be displaced upon a suitable engagement with the dispensing device 1a. For example, the bung 6 may be pushed by protrusions 4 of the dispensing device 1a thereby revealing openings 8a, 8b allowing a fluid F to flow from a fluid supply conduit 3 of the dispensing device into the inner space I.

Figure 4:
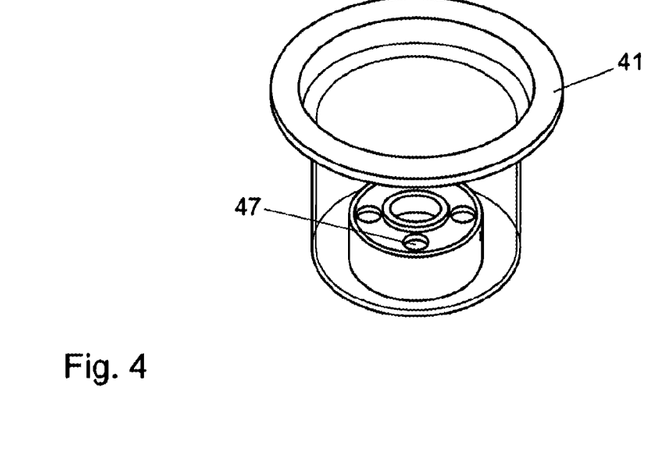
FIG. 4 presents in a schematic way a still further embodiment of a disposable capsule according to the invention.
Figure 4A:
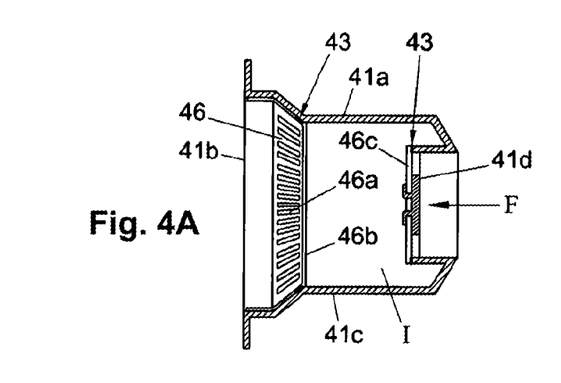
Figure 4B:
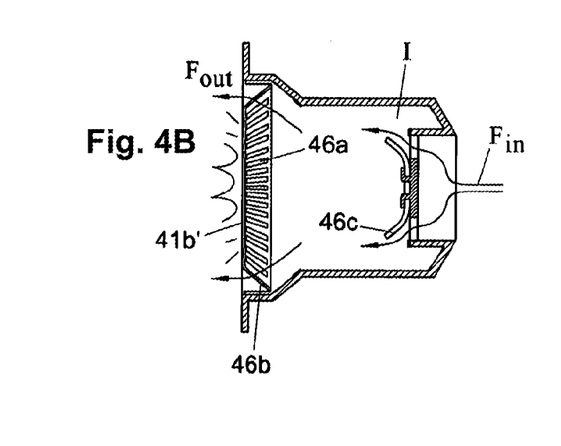
Figure 4C:
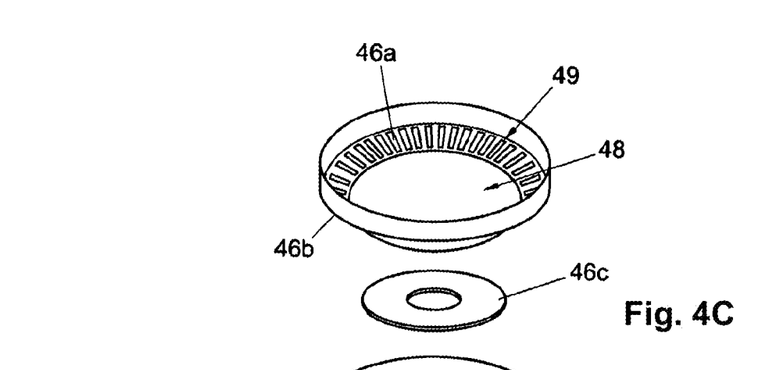

The dispensable capsule 1 according to the invention comprises a displaceable body 6 for discontinuing a portion of the material barrier in the exit area 5b. Although in the present embodiment the displaceable body is being actuated for interacting with the exit area 5b using the dispending device, it will be appreciated that other modes of purposefully displacing the body 6 are contemplated. For example, a pressure-operated displaceable device is schematically depicted in FIG. 4.

In order to discontinue the exit area 5b the displaceable body 6 may comprise one or more working organs 7, conceived to purposefully destroy the exit area. The working organs 7 may relate to pins, knifes, irregularities, sharp crystals, like sugar and so on.

View B shows schematically the disposable capsule 1 in use, for example, engaged with the dispensing device 1a. The dispensing device 1a may be mechanically translated for engaging the capsule 1a pursuant to a manual or automatic driving. Protrusions 4 may therefore transfer a mechanical momentum developed by the dispensing device via the body 6 towards the exit area 5b causing a suitable discontinuation thereof. The beverage, which is being initiated in the inner space I may be drained via the thus created opening away from the capsule.

In accordance with the invention a system is provided enabling a controlled opening of the capsule 1, especially at the exit area 5b thereof. As a result, adverse preferential paths of the fluid inside the inner space are avoided. Thus, at least a number, a size and a position of the exit openings are predetermined which may lead to improved quality of the beverage. It will be appreciated that the system according to the invention, having controlled beverage drainage, may be advantageous also because the force exerted by the displaceable body 6 on the exit area 5b may be controlled in terms of timing and absolute value. As a result a dwell time of the initiated beverage in the disposable capsule may be controlled thereby improving extractability of a suitable extractable product accommodated therein.

View C shows schematically the disposable capsule in elevation. The material barrier 5 may be provided with a rim having openings 8a for allowing the fluid to enter the inner space, as is shown in view B, the displaceable body 6 may be used as a sealing bung for substantially tightly fitting into the opening O in the material barrier 5. The bung 6 may be provided with a suitable cooperating groove and a tightening element 9. The displaceable body 6 may further comprise one or more working elements 7, which, for example, may be implemented as a crown or as a suitable one or two-dimensional array. It is also possible that the working element is continuous, for example, the working element may be ring-shaped for cutting out a round area from the exit area 5b for simplifying drainage of the beverage.

It may be possible that the fluid is supplied under pressure into the inner space I of the disposable capsule 1. Due to the fact that the opening element, i.e. the displaceable body, is provided, the minimum necessary pressure may be reduced leading to a reduction of power consumption of the system according to the invention. However, the fluid dispensing device 1a of the system may be arranged for supplying the fluid to the capsule 1 under a pressure of approximately 4-20 bars, preferably 5-18 bars, more preferably 6-15 bars. In an embodiment, a pressure of 6 bar is supplied to the capsule. In this case the accumulated internal pressure may have a supplementary effect adding to efficiency of discontinuation of the exit area 5b.

Figure 3:
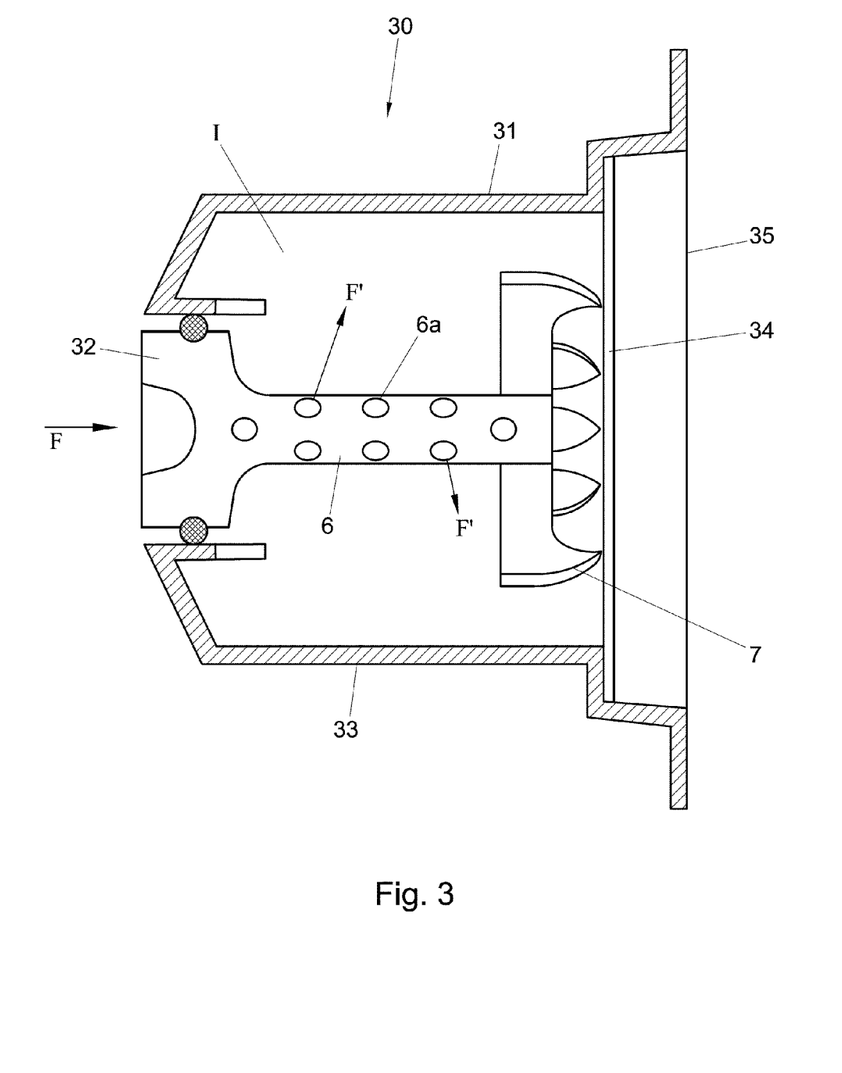
FIG. 3 presents in a schematic way a further embodiment of a disposable capsule according to the invention.

FIG. 3 presents in a schematic way a further embodiment of a disposable capsule according to the invention. In the present embodiment of the disposable capsule 30, the displaceable body 6 is provided with an internal conduit (not shown) and lateral openings 6a for depositing at least a portion of the fluid F' in a deep of the product present in the inner space I. As a result, the incoming flow F may be efficiently distributed in the inner space, its inflow thereto being not limited by throughput capacity of the entrance area.

Also in this embodiment, the displaceable body 6 may be actuated by a dispensing device (not shown) causing the former to discontinue a portion of the material barrier 31, 32, 33, 34 of the capsule 30 in the exit area 34.

In a still further embodiment of the disposable capsule according to the invention the capsule may be provided with an exit filter 35. It will be appreciated that the exit filter may be positioned post the material barrier (as shown), or it may be positioned prior to the material barrier 34, i.e. in the inner space I. It is also possible to integrate the exit filter with at least the working elements of the displaceable body 6. The working portion of the displaceable body 6 may be implemented as a filter comprising suitable protrusions on a surface facing the exit area 34. In this case the filter may act as a portion of the displaceable body. Preferably, the filter is implemented as a suitable membrane, which may be laterally attached to a circumferential wall in the direct vicinity of the exit area 34. The protrusion 6, activated externally, may cause the exit filter to bend and to suitably discontinue the exit area 34.

According to an embodiment of the invention, the exit filter may be arranged to have a sufficiently high tear strength not to be disrupted under the pressure inside the capsule 30. Alternatively, or additionally, the exit filter 35 may form a sufficiently low flow resistance for the beverage exiting the capsule 1. Preferably, the exit filter is formed by a porous sheet, such as filter paper. It will be appreciated that dimension of the pores of the exit filter may be adjusted to an expected grain size of the extractable product accommodated in the inner space.

FIG. 4 presents in a schematic way a still further embodiment of a disposable capsule according to the invention. View A schematically depicts a disposable capsule at rest, i.e. prior to use, view B schematically depicts the disposable capsule in use, i.e., for example, when a suitable fluid dispensing device has been engaged with the capsule for supplying a fluid flow F. View C depicts schematically an elevated view of the disposable capsule, depicted in view A for clarity purposes.

Referring to view A, the disposable capsule comprises an inner space I conceived to accommodate a suitable amount of an extractable product. The inner space is enclosed by a material barrier 41a, 41b, 41c, 41d. The portion 41d is conceived to allow for a passage of an incoming flow of fluid in use, wherein, the portion 41b is conceived to be discontinued by a displaceable body 46. The displaceable body 46 may comprise one or more working organs 46a, for example, pins, knifes or other suitable surface irregularities capable of discontinuing the exit area 41b. In the present embodiment the displaceable body 46 is arranged to be actuated by an internal force caused, for example, by an inner pressure of the fluid accumulated in the inner space I. As a result, a force exerted on a carrier foil 46b will displace it towards the exit area 41a and will suitably press the working elements 46a against the exit area causing suitable discontinuation thereof, see view B.

It is also possible that the displaceable body does not comprise any substantial protrusion for discontinuing the exit area 41b. For example, the displaceable body may comprise a working membrane 48 and a suitable number of throughput openings 49. When the inner space of the capsule is filled with fluid, notably with pressurized fluid, the membrane is swiftly pushed towards the exit area, for example, due to pneumatic force, causing discontinuation thereof. The membrane 48 may be circumferentially attached to the wall of the capsule. It will be appreciated that the membrane may be at least partially manufactured from a filter material. For example, the throughput openings 49 may comprise a filtering filling. Alternatively or additionally, the membrane area 48 may be arranged as an exit filter.

Additionally, it is also possible that the entrance area 41c is actuatable using fluid pressure. For example, suitable entrance openings (see item 47 in view C) may be covered by a sheet, for example a foil 46c, which may deform pursuant to application of pressure and/or elevated temperature of the inflowing fluid F. As a result, the sheet 46c may deform (see view B) allowing the fluid $F_{in}$ to reach the inner space of the capsule.

It will be appreciated that while specific embodiments of the invention have been described above, that the invention may be practiced otherwise than as described. In addition, isolated features discussed with reference to different figures may be combined.

What is claimed is:

1. A disposable capsule usable to prepare a predetermined quantity of beverage suitable for consumption using an extractable product, comprising:
   a material barrier for enclosing an inner space comprising the extractable product, wherein the material barrier comprises:
      an entrance area enabling passage of fluid towards the inner space for interacting with the extractable product for preparing the beverage; and
      an exit area for conducting at least a portion of the beverage away from the disposable capsule; and
   a displaceable body configured to interact with the material barrier for discontinuing at least the exit area thereof for enabling passage of the at least a portion of the beverage away from the disposable capsule;
   wherein the exit area is configured to cooperate with an exit filter, wherein the exit filter is positioned to an opposite site of the material barrier from the inner space.

2. The disposable capsule of claim 1, wherein the disposable capsule is substantially cylindrically formed, the material barrier comprising a circumferential wall, a bottom, and a lid.

3. The disposable capsule of claim 2, wherein the exit area is provided in the lid.

4. The disposable capsule of claim 2, wherein the entrance area is provided in the bottom.

5. The disposable capsule of claim 1, wherein the displaceable body is chemically inert with respect to the extractable product and/or the fluid, and/or the beverage.

6. The disposable capsule of claim 1, wherein the displaceable body is at least partially soluble in the fluid and/or the beverage.

7. The disposable capsule of claim 6, wherein at least a portion of the displaceable body is formed from a taste modifier and/or a taste enhancer.

8. The disposable capsule of claim 1, wherein the material barrier comprises displaceable parts.

9. The disposable capsule of claim 8, wherein a surface of the material barrier constitutes the outer surface of the disposable capsule.

10. The disposable capsule of claim 8, wherein the displaceable body is arranged to form an actuatable region of the outer material barrier.

11. The disposable capsule of claim 10, wherein the actuatable region cooperates with the entrance area.

12. The disposable capsule of claim 10, wherein the the displaceable body is displaceable for displacing the displaceable body towards the exit area thereby providing respective openings through the entrance area and through the exit area.

13. The disposable capsule of claim 1, wherein the displaceable body is positioned for enabling a transfer of a mechanical momentum from a dispensing device to the exit area for discontinuing thereof.

14. The disposable capsule of claim 1, wherein the displaceable body is arranged to discontinue the material barrier for providing an opening through the entrance area for supplying the fluid into the inner space.

15. The disposable capsule of claim 1, wherein the displaceable body comprises at least one working organ for discontinuing a material of the exit area.

16. The disposable capsule of claim 15, wherein, in use, the at least one working organ is displaced substantially perpendicular with respect to a surface of the exit area.

17. The disposable capsule of claim 16, wherein, in use, the at least one working organ is displaced substantially oblique with respect to a surface of the exit area.

18. The disposable capsule of claim 1, wherein the displaceable body comprises a conduit provided with lateral openings for distributing a portion of the fluid in the internal space.

19. The disposable capsule of claim 1, wherein the exit area of the material barrier comprises a portion, which is mechanically weaker than other regions of the material barrier.

20. A capsule, comprising:
   a bottom including an entrance area configured to receive a fluid;
   a lid defining an exit area;
   a circumferential wall extending from the bottom to the lid, the bottom, lid, and circumferential wall defining an inner space configured to hold an extractable product;
   a displaceable body configured to engage the exit area to enable passage of the fluid from the inner space through the exit area; and
   an exit filter positioned adjacent the exit area and to an opposite side of the lid from the inner space.

* * * * *